(12) United States Patent
Soong et al.

(10) Patent No.: US 11,205,128 B2
(45) Date of Patent: Dec. 21, 2021

(54) INFERRED PROFILES ON ONLINE SOCIAL NETWORKING SYSTEMS USING NETWORK GRAPHS

(71) Applicant: Microsoft Technology Licensing, LLC, Redmond, WA (US)

(72) Inventors: Ken Soong, Menlo Park, CA (US); Damien Albert Louis Coullon, Mountain View, CA (US); Luis Steven Lin, Santa Clara, CA (US); Michael Maczka, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 907 days.

(21) Appl. No.: 15/938,147

(22) Filed: Mar. 28, 2018

(65) Prior Publication Data

US 2019/0303771 A1  Oct. 3, 2019

(51) Int. Cl.
*G06N 5/04* (2006.01)
*G06Q 50/00* (2012.01)
*G06F 16/23* (2019.01)

(52) U.S. Cl.
CPC .......... *G06N 5/04* (2013.01); *G06F 16/2379* (2019.01); *G06Q 50/01* (2013.01)

(58) Field of Classification Search
CPC .......... G06N 5/04; G06N 20/00; G06N 7/005; G06Q 50/01; G06F 16/2379; G06K 9/6218
See application file for complete search history.

(56) References Cited

U.S. PATENT DOCUMENTS

| 2009/0198482 | A1* | 8/2009 | Schumacher | ....... G06F 11/3419 |
| | | | | 703/13 |
| 2015/0142706 | A1* | 5/2015 | Gilbert | ..................... G06N 5/02 |
| | | | | 706/11 |
| 2016/0034588 | A1* | 2/2016 | Hyatt | ..................... G06F 16/288 |
| | | | | 707/733 |
| 2016/0232201 | A1* | 8/2016 | Goran | ..................... G06F 3/017 |
| 2016/0232457 | A1* | 8/2016 | Gray | ..................... G06T 11/206 |
| 2017/0309196 | A1* | 10/2017 | Vangala | ................. G09B 19/00 |
| 2017/0344610 | A1* | 11/2017 | Evnine | ................ G06F 16/9535 |
| 2017/0345074 | A1* | 11/2017 | Wadley | ................. G07F 19/209 |
| 2018/0146000 | A1* | 5/2018 | Muddu | ............... G06K 9/2063 |
| 2018/0203926 | A1* | 7/2018 | Phan | ..................... G06F 16/951 |
| 2019/0005024 | A1* | 1/2019 | Somech | ................ H04L 51/36 |
| 2020/0012958 | A1* | 1/2020 | Natanson | ............... G06N 5/046 |

* cited by examiner

*Primary Examiner* — Abdullahi E Salad
(74) *Attorney, Agent, or Firm* — Schwegman Lundberg & Woessner, P.A.

(57) ABSTRACT

An online social networking system collects data relating to members, and clusters the data into a plurality of clusters. The system identifies anomalous activity by a member in a cluster, and predicts an update to a profile of the member based on the identified anomalous activity of the member. The system presents to the member a proposed update to the profile of the member based on the prediction, receives input from the member in response to the proposed update, and updates the profile of the member based on the input received from the member.

19 Claims, 8 Drawing Sheets

INFERRED PROFILES ON ONLINE SOCIAL NETWORKING SYSTEMS USING NETWORK GRAPHS

TECHNICAL FIELD

The present disclosure generally relates to the technical field of online social networking systems, and in an embodiment, but not by way of limitation, to an online social networking system that infers updates to member profiles based on a network graph.

BACKGROUND

Online social networks provide members with the ability to connect and communicate with other members. Online social networks include a personal profile for each member, which includes the educational history, work history, and personal interests of the member. An online social network should provide the most up-to-date information on members. However, such profiles are many a times not up to date. For example, when a member of an online social network system switches to a new job, this often involves many tasks for the member, and the member often neglects to update his or her profile. For many members, it could be months before they update their profile. In the meantime, the presence of outdated information reduces the relevance of the online social networking system's targeting systems (such as advertisements and jobs), reduces the quality of the system's paid searches (such as searches by a job recruiter), and makes it harder for members to find each other.

DESCRIPTION OF THE DRAWINGS

Some embodiments are illustrated bye way of example and not limitation in the accompanying drawings, in which.

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all of the specific details and/or with variations, permutations, and combinations of the various features and elements described herein.

As a solution to the above-discussed issues relating to outdated online profiles, an embodiment implements a method to intelligently infer a member's profile and to make suggestions to the member to simplify the process of updating his or her profile.

In an embodiment, an online social networking system detects when a member's profile is not up to date. When this is detected, the system surfaces (that is, determines and/or presents to a user) the most probable update to the member's profile, asks the member whether the proposed update is correct, and updates the member's profile if the proposed update is correct. In an embodiment, a social graph within the online social networking system is leveraged to greatly increase such detections and predictions.

Figure 1:
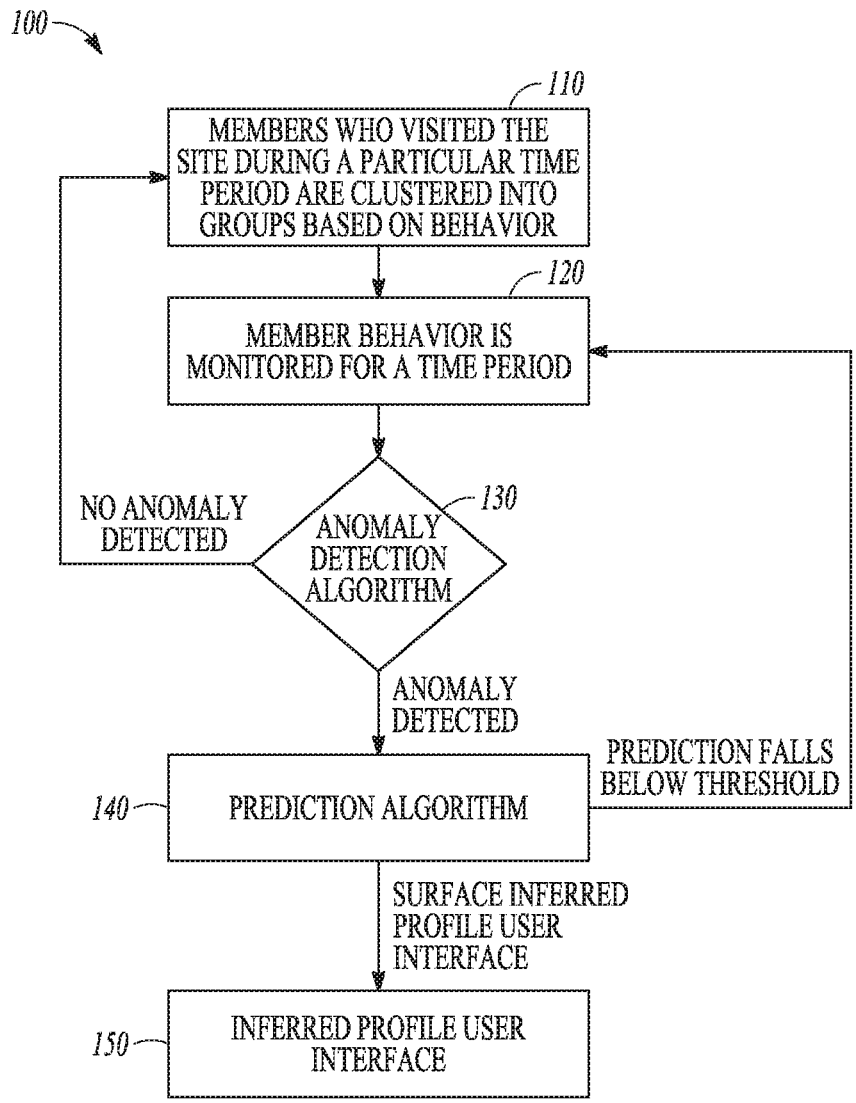
FIG. 1 is a block diagram illustrating a basic flow of inferring an update to a member profile on an online social networking system.

More specifically, in an embodiment, and referring to FIG. 1, at 110, an online social networking system collects, over a time period, data relating to members in the online social networking system, and then clusters the data into a plurality of clusters. At 120, the member behavior is monitored for the time period, and at 130, the online social networking system determines if there is any anomalous activity on the online social networking system by a member in a cluster. If no anomalous activity is detected, control returns to operation 110. If anomalous activity is detected, then at 140, the system predicts an update to a profile of the member on the online social networking system based on the identified anomalous activity of the member. If the prediction falls below a threshold (that is, the system is not entirely certain about a proposed update), control returns to operation 120. If the prediction exceeds the threshold, then at 150, the online social networking system presents to the member a proposed update to the profile of the member based on the prediction. Thereafter, the online social networking system receives input from the member in response to the proposed update, and if the input is positive, the online social networking system updates the profile of the member based on the positive input received from the member.

One primary innovation and advantage of the process and system discussed in the previous paragraph is the use of a network graph on an online social networking system to detect when profiles are outdated. In an embodiment, the system uses a clustering method (e.g., k-means) to associate similar members into groups. For this clustering, the system can use all available member features (e.g., current company, position, tenure, education, country, number of connections, last profile update, etc.). Within each of these groups, the system expects members to behave similarly. When the system detects that a single member in the group has connection patterns (or search or invitation patterns) that are different from the rest of the group, the system flags this member as an anomaly. Then, for members flagged as an anomaly, the system tries to predict the new organization (or other profile data element that needs updating) with which the member is associated as is disclosed in the following paragraphs. Other relevant signals that can indicate that a member's profile is outdated can include the IP address that a member is using (for example, the IP address has recently changed, and particularly if it maps to a known corporate network), the amount of time spent on the online social networking system, the activity of the member on the job posting section of the online social networking system, the number of profiles viewed by the member, and the number of members who have viewed the profile of the member.

Figure 2A:
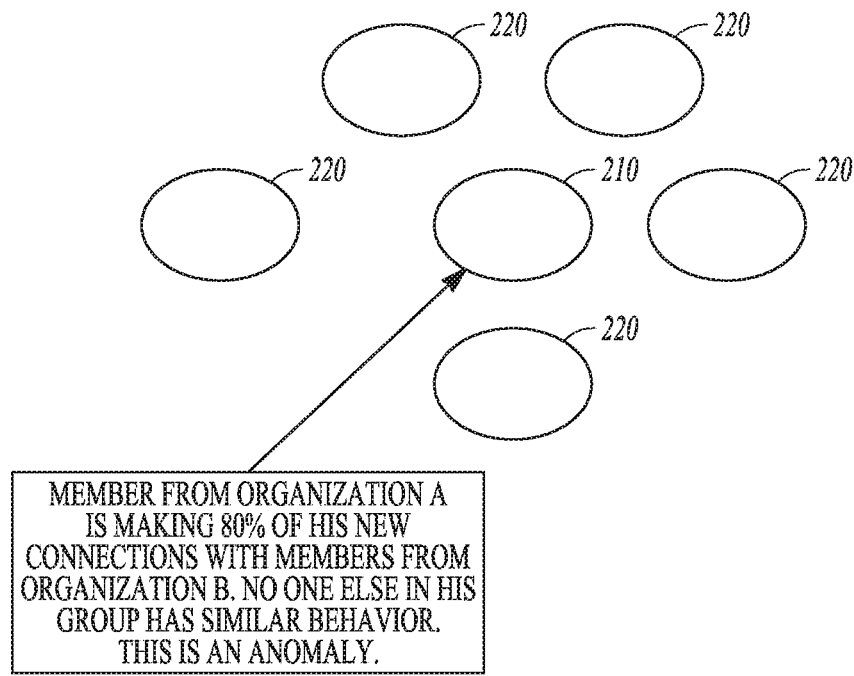
FIGS. 2A and 2B are diagrams illustrating a cluster technique in an online social networking system.
Figure 2B:
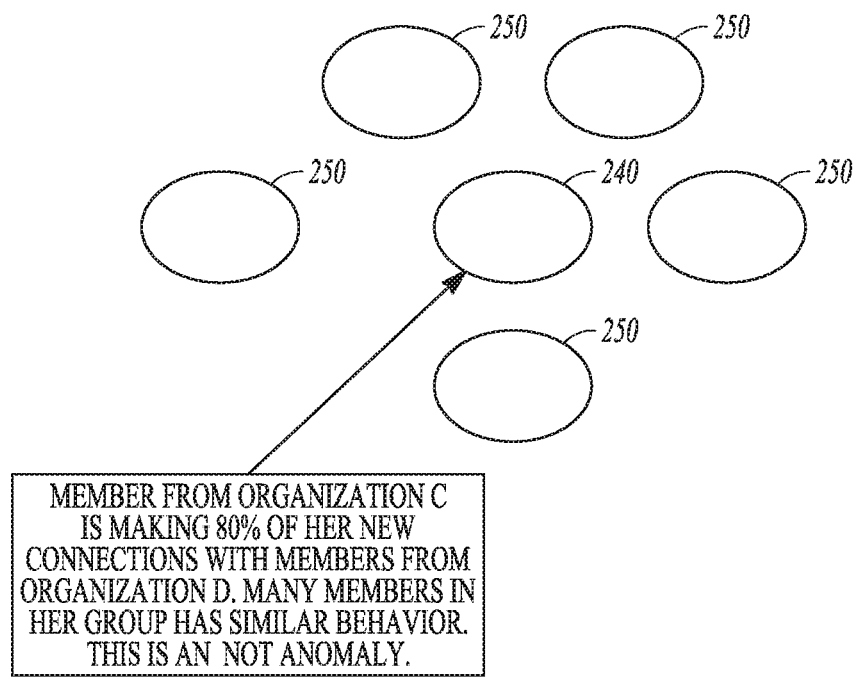

This is illustrated in a simple, straightforward manner in FIGS. 2A and 2B. FIG. 2A illustrates a first clustered group from on online social network. In this group, a particular member 210 is making 80% of his or her new connections with persons associated with Organization A. No other member 220 in this group is exhibiting this high connection rate with persons associated with Organization A. Such behavior can be deemed an anomaly. FIG. 2B illustrates another clustered group, wherein the particular member 240 is making 80% of her new connections with persons associated with Organization D. In contrast to the group in FIG. 2A, many other members 250 in the group are also making a high level of their new connections with persons associated with Organization D. Because many other members in this group are making many of these same connections, this is not considered an anomaly.

Once the system detects that a member has anomalous connection activity, the system attempts to predict the member's new organization (or other change to the member's profile data). The system uses a classifier that is chosen based on performance when testing with historical data (for example, logistic regression, gradient boosted trees, random forest, etc.). For each potential organization that a member could have become associate with or will be soon associated with, the system assigns a probability score to each potential organization and only surfaces (that is, suggests to the member) predictions above a certain score.

Figure 8:
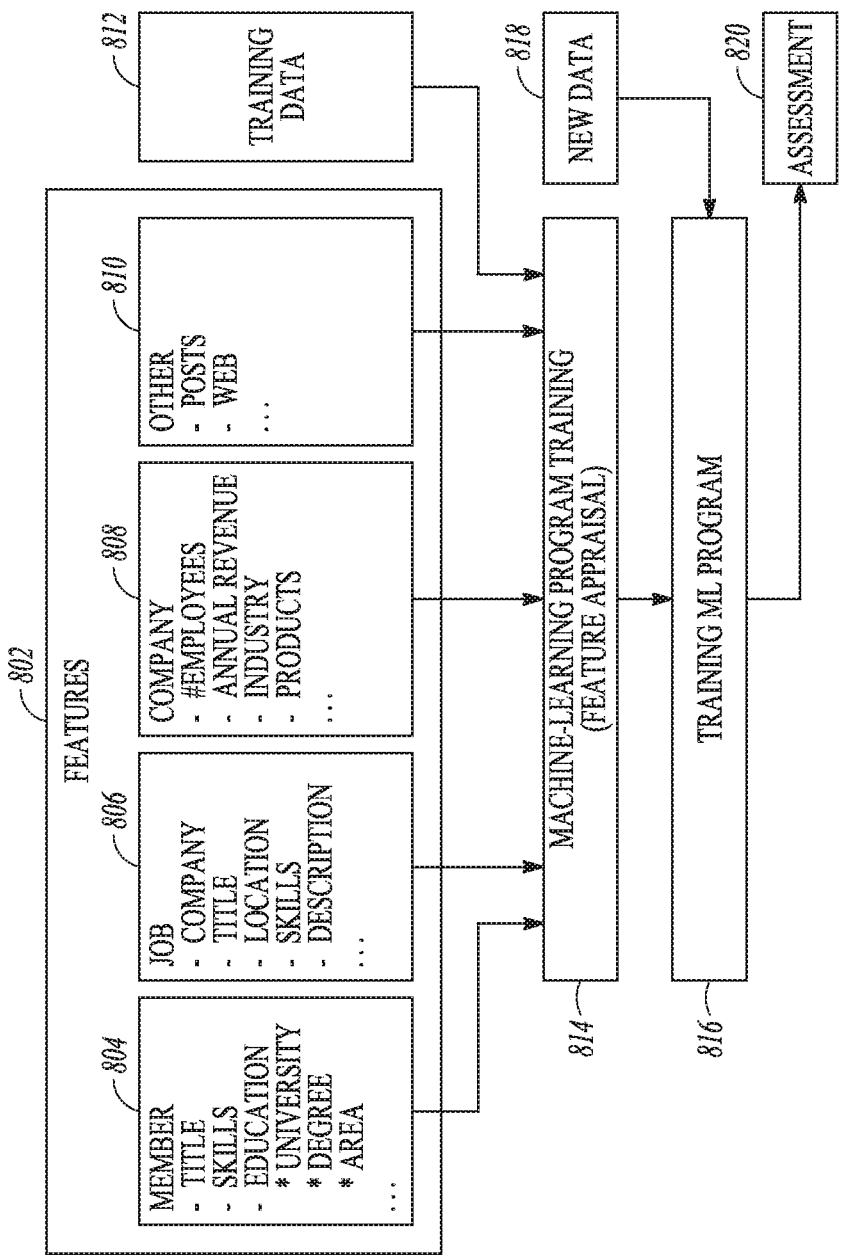
FIG. 8 is an illustration of the training and use of a machine learning program, according to some example embodiments.

FIG. 8 illustrates the training, classifying, and use of a machine-learning program 816, according to some example embodiments. In some example embodiments, machine-learning programs, also referred to as machine-learning algorithms or tools, are utilized to perform operations associated with inferring changes to a member's profile.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 812 in order to make data-driven predictions or decisions expressed as outputs or assessments 820. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring inferred profile updates.

In general, there are two types of problems in machine learning: classification problems and regression problems. Classification problems aim at classifying items into one of several categories (for example, is this object an apple or an orange?). Regression algorithms aim at quantifying some items (for example, by providing a value that is a real number). In some embodiments, example machine-learning algorithms provide a ranking score (e.g., a number from 1 to 100) to qualify each inferred attribute of a member's profile as a probable correct update. The machine-learning algorithms utilize the training data 812 to find correlations among identified features 802 that affect the outcome.

In one example embodiment, the features 802 may be of different types and may include one or more of member features 804, job features 806, company features 808, and other features 810. The member features 804 may include one or more of the data in the member profile 302, such as title, skills, experience, education, and the like. The company features 808 may include any data related to the company. In some example embodiments, additional features in the other features 810 may be included, such as post data, message data, web data, and the like.

With the training data 812 and the identified features 802, the machine-learning tool is trained at operation 814. The machine-learning tool appraises the value of the features 802 as they correlate to the training data 812. The result of the training is the trained machine-learning program 816.

When the machine-learning program 816 is used to perform an assessment, new data 818 is provided as an input to the trained machine-learning program 816, and the machine-learning program 816 generates the assessment 820 as output. For example, when an anomaly is detected in a cluster, the assessment 820 includes the scores for the probability of the correctness of the inferred update to the member's profile.

More specifically, in order to train the classifier, the system can use a large variety of signals. If a member of the online social networking system is connecting primarily with members of a single organization (and other members in the cluster are not), this increases the probability score associated with the prediction that this member is now associated with this organization. If the member has connected to persons at the organization who have relatively few connections and/or are not very active on the online social networking system, this is indicative of an explicit intent, and increases the probability that the member has become associated with the organization. If the member has connected with a wide variety of persons across the organization, such as persons from marketing, engineering, and human resources, this wide variety results in a higher probability value being assigned to the organization. If the member connects to persons at the organization whose skills match with the member, this increases the probability value assigned to the organization. If the member connects with organizations whose employee summaries match or are similar to the member's, this increases the probability value assigned to this organization. The more interactions the member has with the organization, such as via profile views, messaging, and applications for positions in the organization, the higher the probability value that will be assigned to the organization. If the system determines that an organization takes on a lot of people from the organization that the member is currently associated with, this increases the probability value assigned to the organization. The system takes into account the size of the organization with which the member is connecting, and the larger the organization, the lower the probability value that will be assigned to the organization, because as the size of the organization increases, this increases the likelihood that the member is connecting to the organization by chance, not because the member has become associated with the organization. The system takes into account the number of openings at the organization (by monitoring job postings or monitoring member profiles from the organization), and a high number of openings at the organization increases the probability value assigned to the organization. The system takes into account the distance between the member's residence or current organization and the potential organization, such that a lower probability value is assigned to the potential organization as the distance increases.

The foregoing factors and considerations can be illustrated by retuning to FIGS. 2A and 2B. In the first instance, as illustrated in FIG. 2A, the member 210 may be changing his or her association from Organization A to Organization B. It is noted that the member has Organization A listed on his or her profile. The online social networking system determines however that the member is connecting with a lot of people who are associated with Organization B, and significantly more than other persons 220 who are associated with Organization A. The system further determines that the member is connecting with persons in all functions across Organization B. The system further determines via examining other members' profile updates that Organization B has been bringing on multiple other members from Organization A, and that the member's skills match closely with other persons who are associated with Organization B. All of this together helps the system's classifier predict that the member is now associated with Organization B.

In the second instance, as illustrated in FIG. 2B, the social network graph may indicate that the member 240 is considering several different organizations with which to associate. For example, the member may have listed on his or her profile an association with Organization C. The system notices however that the member is connecting with a lot of members from many different organizations, and significantly more than the other members 250 in his or her cluster group. Furthermore, the member is connecting primarily with a small community within each organization. The member may also have skills that match many of the organizations where he or she is making connections. Based on these data, a trained model of the online social networking system will likely not be very confident about exactly which organization to predict for the member. In this instance, the system would monitor another week or so of activity and repeat the classification. Further in this instance, what might ultimately push one organization across the probability threshold is if the system begins to observe repeated logins by the member from an organization's internal IP address.

For any embodiment of an online social networking system that predicts updates to a member profile, as alluded to in the previous paragraph and in connection with FIG. 8, it is necessary to train a model using existing labeled data. This may be made easier because the online social networking system may already have a large repository of behaviors for members who change companies (or any organization) and actually do update their online profile. In such a case, the online social networking system can collect a random subset of members who have changed jobs (or positions) and who have updated their online profile within a certain time period of their posted start date at their new organization, for example within four weeks of the posted start date at the new organization. The online social networking system can then analyze the behavior of these members, particularly on the dimensions discussed in the previous paragraphs (for example, the historical data may show that a member connecting with members from a particular company who have few connections increases the probability that the prediction that the member is now employed by this particular company is correct). Based on this analysis, the system can tune the parameters for both an anomaly detection algorithm/model within a cluster and a prediction algorithm/model (that is, predicting the member's new organization).

In an embodiment, the tuning uses a portion (training set) of the historical data on the online social networking system to calculate the feature weights to get the best performing classifier. The system then applies the classifier to a different portion (testing set) of the historical data, and uses the testing set to find the true performance of the current model. Based on the performance of the model, a threshold value is set that indicates the confidence level at which the system will present the inferred company or organization to the member (for example, the system only presents the inferred company to a member if the confidence/probability is greater than 80%). For example, the model, trained with historical data, may indicate that when a member connects with members of an organization at a substantially higher rate than other members in a cluster (e.g., at a ratio of 5 to 1), the historical data shows that 80% of the time the member has become associated with this new organization. This probability can then be fused with other signal probabilities (e.g., by a simple averaging), and an overall probability can be determined.

While the functionality of updating a member's profile from a past organization to a current organization has been discussed, the system can use the same identifying, training, and modeling techniques to infer a current organization to a member who did not identify an organization when the member initially created his or her online profile. In such a case, the system can create a dummy organization for the member (e.g., NULL) and then run the same detective and predictive algorithms/models to detect and predict the member's current organization.

Figure 3A:
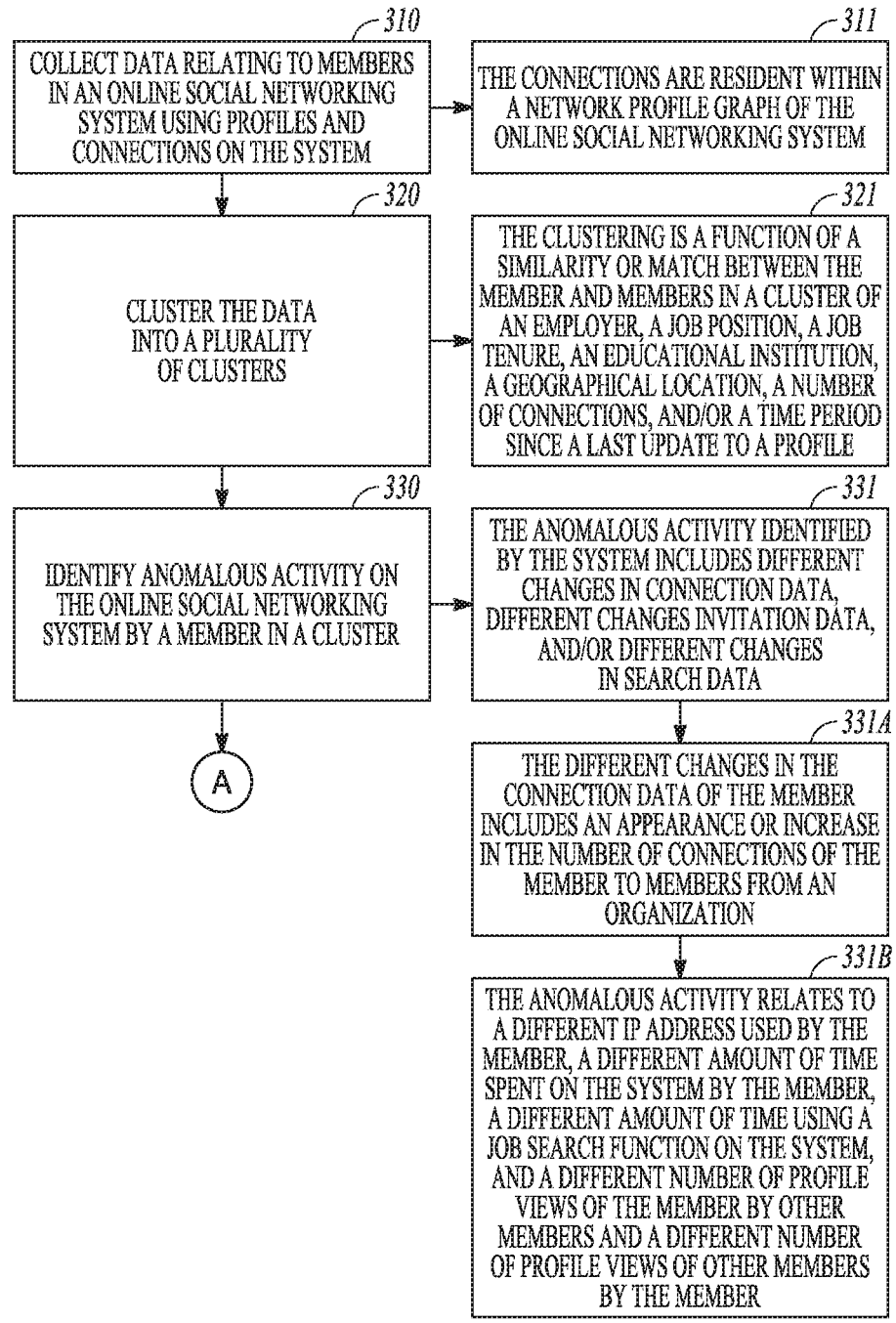
FIGS. 3A and 3B are block diagrams illustrating operations and features of inferring an update to a member profile on an online social networking system.
Figure 3B:
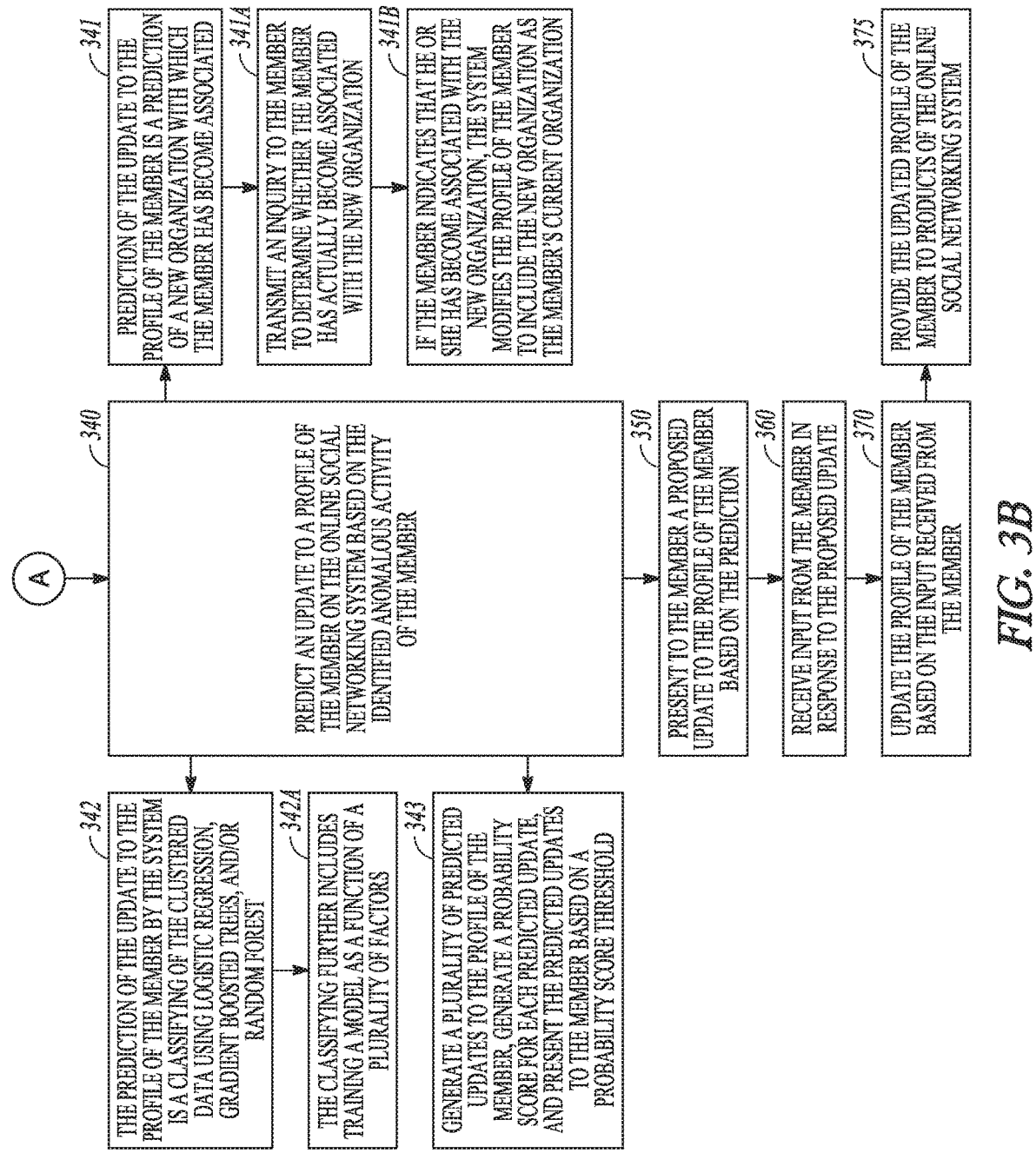

FIGS. 3A and 3B are a block diagram illustrating operations and features of an example system and method of inferring updates to members' profiles on an online social networking system. In various embodiments, the system and method may be implemented by one or more of the modules or processors of FIG. 5 and/or FIG. 6. FIGS. 3A and 3B include a number of process blocks 310-375. Though arranged substantially serially in the example of FIGS. 3A and 3B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Figure 4:
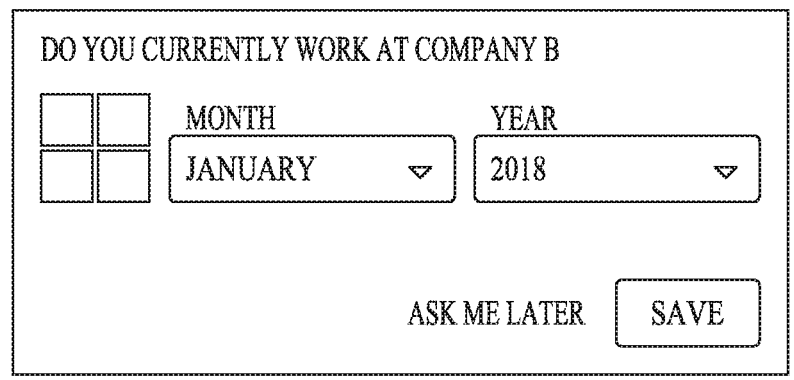
FIG. 4 is an illustration of a user interface in an online social networking system.

Referring now specifically to FIGS. 3A and 3B, at 310, an online social networking system collects, over a time period, data relating to members in the online social networking system. This collection of data is made possible by the existence of profiles of members of the online social networking system and connections among members on the system, which are created when a person becomes a member of the online social networking system, and which is discussed in more detail in connection with FIG. 5. As indicated at 311, the connections are resident within a network profile graph of the online social networking system. At 320, the online social networking system clusters the data into a plurality of clusters (FIGS. 2A and 2B). This clustering can be based on any data in the members' profiles, such as, for example, all members presently being employed by the same company. At 330, the online social networking system identifies anomalous activity on the online social networking system by a particular member in a particular cluster. As is discussed in more detail herein, this anomalous activity can be something such as the particular member is connecting with many more persons from a particular company than are other members in the cluster. At 340, the system predicts an update to a profile of the particular member on the online social networking system based on the identified anomalous activity of the particular member. As discussed above, this prediction is based on training a model with historic system data (and in particular, members who have changed jobs or organizations and who have updated their profiles to reflect their new job or organization). At 350, the online social networking system presents to the particular member a proposed update to the profile of the particular member based on the prediction. An example of a user interface that is used to present the proposed update to the member is illustrated in FIG. 4. At 360, the online social networking system receives input from the particular member in response to the proposed update, and at 370, the online social networking system updates the profile of the particular member based on the input received from the particular member. Specifically, the online social networking system will update the profile of the particular member if the member confirms that he or she is now associated with the predicted company or organization.

At 321, it is noted that the clustering operation is a function of a similarity or match between the particular member and members in a cluster of one or more of an employer, a job position, a job tenure, an educational institution, a geographical location, a number of connections, and a time period since a last update to a profile. For example, the cluster could be based on the fact that all the members reside in the greater Minneapolis-St. Paul area. Thereafter, if one of the members begins connecting with other members whose profiles indicate that they all reside in the Los Angeles area, this member may have relocated to the Los Angeles area, and the online social networking system can inquire of this member if this is indeed the case and if the system should update the member's profile.

At 331, the anomalous activity identified by the online social networking system includes different changes in connection data of the particular member (when compared with the changes in connection data of other members in the cluster), different changes in invitation data (when compared with the changes in invitation data of other members in the cluster), and/or different changes in search data of the particular member (when compared with the changes in search data of other members in the cluster). It is noted that the analysis of these differences between the particular member and other members in the cluster occurs during a particular time period, such as during a particular week or month. Also, the invitation data that are analyzed can consist of both incoming and outgoing invitation data, that is, invitations sent out to other members by the particular member and invitations sent to the particular member by other members.

At 331A, it is noted that the different changes in the connection data of the particular member include (once again, when compared with other members in the cluster an appearance or increase in the number of connections of the particular member to members from a particular organization. The particular organization can be a business organization or a company, but can also be an education institution, a charitable organization, a hospital, or any other type of organization.

At 331B, it is noted that the anomalous activity, once again when compared with other members in the cluster, relates to a different IP address used by the particular member, a different amount of time spent on the online social network system by the particular member, a different amount of time using a job search function on the online social networking system, and a different number of profile views of the particular member by other members and a different number of profile views of other members by the particular member on the online social networking system.

Regarding the different IP address, the particular member and the other members in the cluster may have been grouped together in the clusters because they all are employed by the same company. However, while the particular member's profile may indicate that he or she is employed by that company, the IP address associated with the member's email may indicate that he or she is no longer associated with that company (e.g., the member's current email address may be member.name@newcompany.com). Upon determining this information, the online social networking system can act accordingly in making a prediction and profile update recommendation to the member.

At 341, the operation of the prediction of the update to the profile of the particular member is a prediction of a new organization with which the particular member has become associated. As noted elsewhere herein, this prediction can be based on anomalous activity of the particular member as compared with other members in a cluster. Then, at 341A, the online social networking system transmits an inquiry to the particular member to determine whether the particular member has actually become associated with the new organization. That is, the online social networking system attempts to verify its prediction that the particular member has moved to this new organization. Then, at 341B, if the particular member indicates that he or she has become associated with the new organization, the online social networking system modifies the profile of the particular member to include the new organization as the particular member's current organization (e.g., the particular member's current employer).

At 342, the prediction of the update to the profile of the particular member by the online social networking system involves classifying of the clustered data using one or more of logistic regression, gradient boosted trees, and random forest. At 342A, as noted previously, the classifying further includes training a model as a function of a plurality of factors. These factors can include that the particular member is connecting with persons associated with a particular organization, a count of the number of connections by members with whom the particular member is connecting, a breadth of connections within the particular organization by the particular member, a skill match between the particular member and connections of the particular member, a similarity between summaries of the particular member and connections of the particular member, an interaction with the particular organization by the particular member on the online social networking system, a flow of other members from a current organization of the particular member to another organization, a size of an organization with whom the member is connecting, a count of the number of openings at the particular organization, an amount of time spent on the online social networking system by the member, a number of profile views by the member, a number of views of the profile of the member by other members, and a geographical distance between the current organization of the member and the organization with which the member is connecting.

At 343, the online social networking system generates a plurality of predicted updates to the profile of the particular member, generates a probability score for each predicted update, and presents one or more of the predicted updates to the particular member based on a probability score threshold. As indicated elsewhere herein, different factors are considered to have a different effect on the likeliness that the prediction of the online social networking system is correct. For example, in connection with training the classifier, if there is a signal on the system that a member of the online social networking system is connecting primarily with members of a single company (and other members in the cluster are not), this increases the probability score associated with the prediction that this member is now associated with this single company. As noted, the system can train a predictive model using historical data of members who have changed jobs and also updated their profiles, and based on the trained model the system can determine which signals are more important than others, which signals increase a probability score, which signals decrease a probability score, and the magnitudes of such increases or decreases.

At 375, after receiving confirmation from the member and updating the profile of the member, the online social networking system provides the updated profile of the particular member to one or more products of the online social networking system. Examples of products of the online social networking system could be suggesting job openings to the member and/or suggesting other members to connect with on the online social networking system. In this manner, the one or more products on the online social networking system can provide a new or updated service to the particular member based on the updated profile of the particular member. For example, if the particular member's updated profile now includes the current company with which the member is now employed, the online social networking system can recommend that the particular member connect with other members who are employed by the member's new current company. In this manner, the functioning of the computer and the online social networking system is improved.

Figure 5:
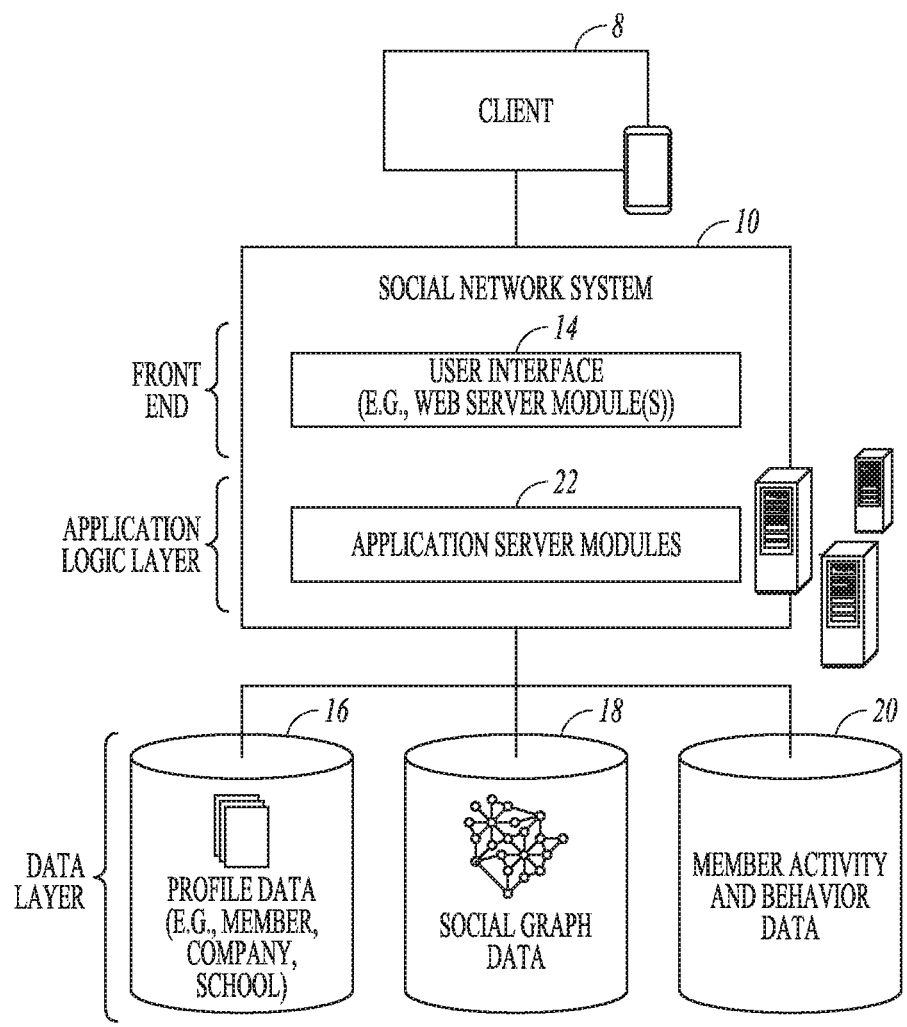
FIG. 5 is a block diagram of the functional modules or components that comprise a computer network-based online social networking system, including application server modules consistent with some embodiments of the invention.

The foregoing systems and methods can be executed on an online social networking system as is illustrated in FIG. 5. Specifically, FIG. 5 is a block diagram of the functional modules or components that comprise a computer-based or network-based online social networking system 10 consistent with some embodiments of the above-described systems and methods. As shown in FIG. 5, the online social networking system 10 is generally based on a three-tiered architecture, comprising a front-end layer, application logic layer, and data layer, and can communicate with a client device 8. As is understood by skilled artisans in the relevant computer and Internet-related arts, each module or engine shown in FIG. 5 represents a set of executable software instructions and the corresponding hardware (e.g., memory and processor) for executing the instructions. To avoid obscuring the present subject matter with unnecessary details, various functional modules and engines that are not germane to conveying an understanding of the present subject matter have been omitted from FIG. 5. However, a skilled artisan will readily recognize that various additional functional modules and engines may be used with an online social networking service, such as that illustrated in FIG. 5, to facilitate additional functionality that is not specifically described herein. Furthermore, the various functional modules and engines depicted in FIG. 5 may reside on a single server computer, or may be distributed across several server computers in various arrangements. Moreover, although depicted in FIG. 5 as a three-tiered architecture, the present subject matter is by no means limited to such architecture.

As shown in FIG. 5, the front end comprises a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile devices and operating systems.

As shown in FIG. 5, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the online social networking service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the online social networking service. A "connection" may require a bi-lateral agreement by the members, such that both members acknowledge the establishment of the connection. The degree of connectivity refers to the amount or number of connections that exist for a particular person and/or the amount or number of connections among a group of persons. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 5, consistent with some embodiments, the system may include additional databases for storing information relating to a wide variety of entities, such as information concerning various online or offline groups, job listings or postings, photographs, audio or video files, and so forth.

With some embodiments, the online social networking service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generate various user interfaces (e.g., web pages) with data retrieved from various data sources in the data layer. With some embodiments, individual application server modules 22 are used to implement the functionality associated with various applications, services and features of the online social networking service. For instance, a messaging application, such as an email application, an instant messaging application, or some hybrid or variation of the two, may be implemented with one or more application server modules 22. Of course, other applications or services may be separately embodied in their own application server modules 22.

The online social networking service may provide a broad range of applications and services that allow members the opportunity to share and receive information, often customized to the interests of the member. For example, with some embodiments, the online social networking service may include a photo sharing application that allows members to upload and share photos with other members. As such, at least with some embodiments, a photograph may be a property or entity included within a social graph. With some embodiments, members of an online social networking service may be able to self-organize into groups, or interest groups, organized around a subject matter or topic of interest. Accordingly, the data for a group may be stored in a database. When a member joins a group, his or her membership in the group will be reflected in the social graph data stored in the database with reference number 18. With some embodiments, members may subscribe to or join groups affiliated with one or more companies. For instance, with some embodiments, members of the online social networking service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the database with reference number 18.

Figure 6:
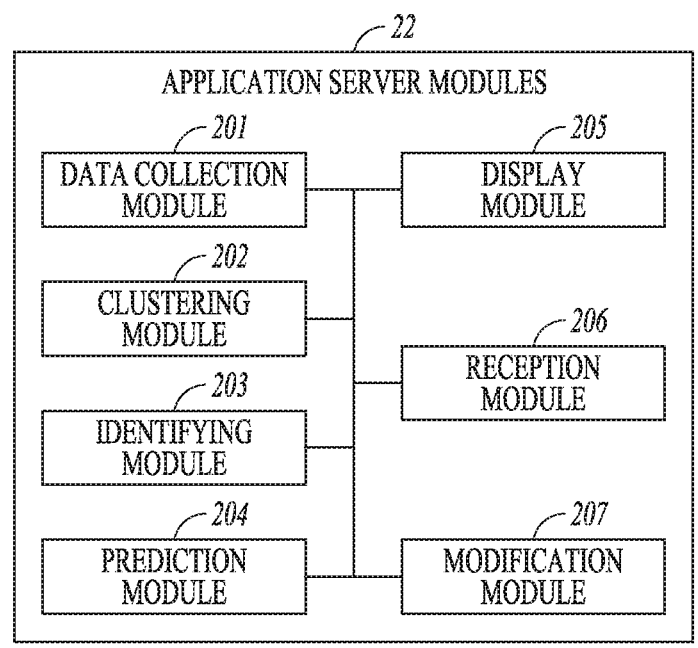
FIG. 6 is a block diagram depicting some example application server modules of FIG. 5.

FIG. 6 is a block diagram of several example modules that can make up the application server modules 22 of FIG. 5. A data collection module 201 collects data relating to members in the online social networking system 10. A clustering module 202 clusters the data into a plurality of clusters. An identifying module 203 identifies anomalous activity on the online social networking system by a particular member in a particular cluster. A prediction module 204 predicts an update to a profile of the particular member on the online social networking system based on the identified anomalous activity of the particular member. A display module 205 presents to the particular member a proposed update to the profile of the particular member based on the predicting. A reception module 206 receives input from the particular member in response to the proposed update. A modification module 207 updates the profile of the particular member based on the input received from the particular member.

Figure 7:
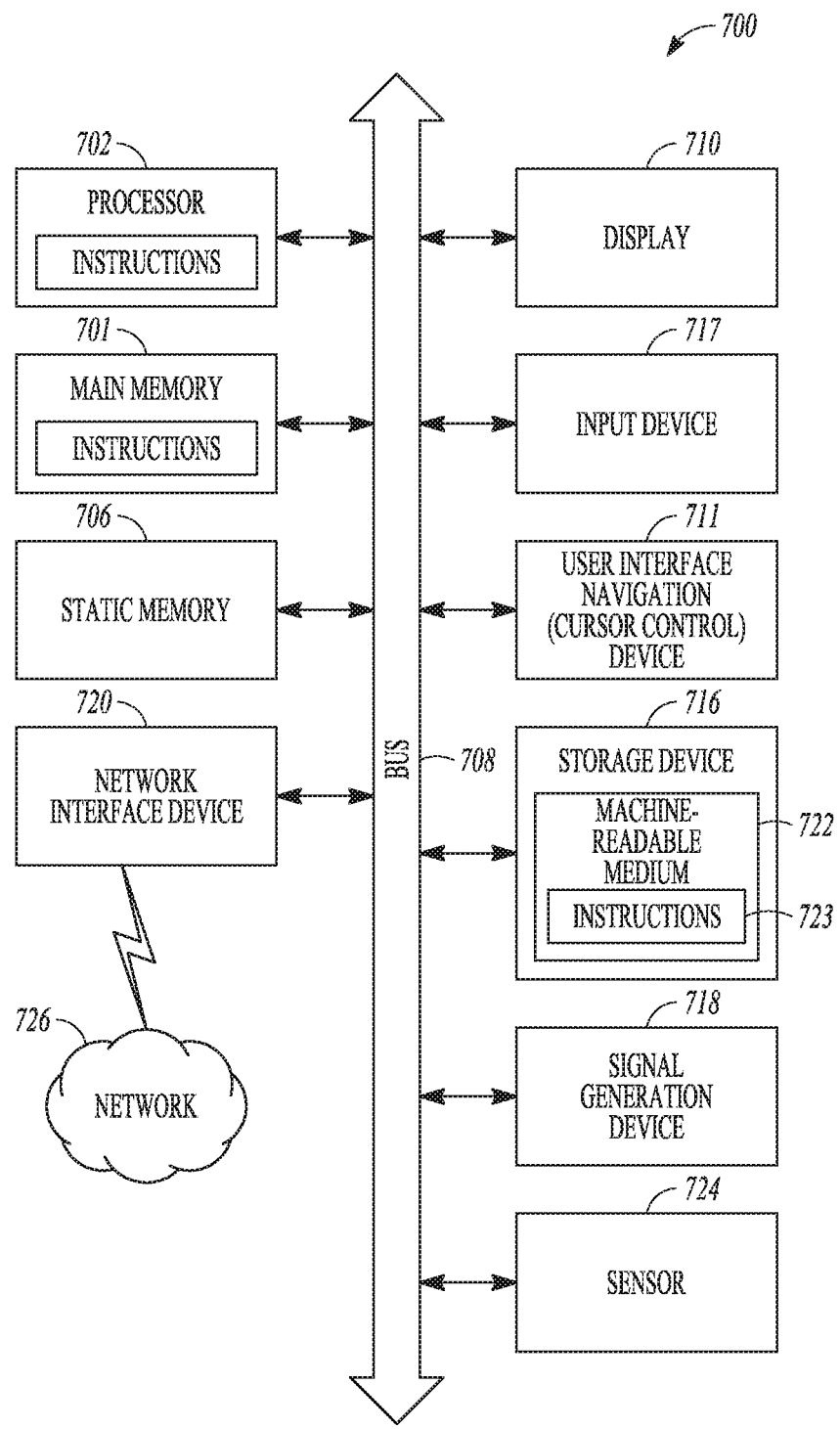
FIG. 7 is a block diagram of a machine in the form of a computing device within which a set of instructions, for causing the machine to perform any one or more of the methodologies discussed herein, may be executed.

FIG. 7 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 701 and a static memory 706, which communicate with each other via a bus 708. The computer system 700 may further include a display unit 710, an alphanumeric input device 717 (e.g., a keyboard), and a user interface (UI) navigation device 711 (e.g., a mouse). In one embodiment, the display, input device and cursor control device are a touch screen display. The computer system 700 may additionally include a storage device 716 (e.g., drive unit), a signal generation device 718 (e.g., a speaker), a network interface device 720, and one or more sensors 721, such as a global positioning system sensor, compass, accelerometer, or other sensor.

The drive unit 716 includes a machine-readable medium 722 on which is stored one or more sets of instructions and data structures (e.g., software 723) embodying or utilized by any one or more of the methodologies or functions described herein. The software 723 may also reside, completely or at least partially, within the main memory 701 and/or within the processor 702 during execution thereof by the computer system 700, the main memory 701 and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 723 may further be transmitted or received over a communications network 726 using a transmission medium via the network interface device 720 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process comprising:
    collecting, over a time period, data relating to activity of users in an online social networking system;
    clustering the users, based on the collected data, into a plurality of clusters, the clusters separated by the activity of the users;
    identifying, by comparing a network graph of a particular user to network graphs of other users in a particular cluster of the clusters, anomalous activity on the online social networking system by the particular user in the particular cluster, the network graph including nodes representing respective users and edges between nodes indicating how the respective users are connected to other users of the users in the online social networking system;
    predicting, based on data relating to activity of other users in a same or different cluster of the clusters that have updated their profile, an update to a profile of the particular user on the online social networking system based on the identified anomalous activity of the particular user, wherein predicting the update includes generating a plurality of predicted updates to the profile of the particular user, generating a probability score for each predicted update;
    presenting to the particular user one or more of the predicted updates to the profile of the particular user based on the predicting;
    receiving input regarding the one or more presented updates from the particular user in response to the one or more presented updates; and
    updating the profile of the particular user based on the input received from the particular user.

2. The process of claim 1, wherein the anomalous activity comprises, when compared with other users in the particular cluster, different changes in connection data of the particular user, different changes in invitation data of the particular user, or different changes in search data of the particular user, during the time period.

3. The process of claim 2, wherein the different changes in the connection data of the particular user comprises, when compared with other users in the particular cluster, an appearance or increase in a number of connections of the particular user to uses from a particular organization.

4. The process of claim 1, wherein the anomalous activity, when compared with other users in the particular cluster, relates to one or more of a different IP address used by the particular user, a different amount of time spent on the online social network system by the particular user, a different amount of time using a job function on the online social networking system, and a different number of profile views of the particular user and a different number of profile views by the particular user on the online social networking system.

5. The process of claim 1, wherein the predicting the update to the profile of the particular member comprises predicting a new organization with which the particular user has become associated.

6. The process of claim 5, comprising:
    transmitting an inquiry to the particular user to determine whether the particular user has become associated with the new organization; and
    modifying the profile of the particular user to include the new organization when the particular user indicates that they are associated with the new organization.

7. The process of claim 1, comprising applying the updated profile of the particular user to one or more products of the online social networking system such that the one or more products can provide an improved service to the particular user based on the updated profile of the particular user.

8. The process of claim 1, wherein the clustering is a function of a similarity or match between the particular user and users in a cluster of one or more of an employer, a job position, a job tenure, an educational institution, a geographical location, a number of connections, or a time period since a last update to a profile.

9. The process of claim 1, wherein the predicting the update to the profile of the particular user comprises classifying the clustered data using one or more of logistic regression, gradient boosted trees, and random forest.

10. The process of claim 9, wherein the classifying comprises training a model as a function of one or more of the particular user connecting with persons associated with the particular organization, a number of connections by users with whom the particular user is connecting, a breadth of connections within the particular organization by the particular user, a skill match between the particular user and connections of the particular user, a similarity between summaries of the particular user and connections of the particular user, an interaction with the particular organization by the particular user on the online social networking system, a flow of users from a current organization of the particular member to the particular organization, a size of the particular organization, a number of openings at the particular organization, an amount of time spent on the online social networking system by the particular user, a number of profile views by the particular user, a number of views of the profile of the particular user by other users, and a geographical distance between the current organization of the particular user and the particular organization.

11. The process of claim 1, wherein the connections are resident within a network profile graph of the online social networking system.

12. A non-transitory computer-readable medium comprising instructions
that when executed by a processor execute a process comprising:
collecting, over a time period, data relating to activity of users in an online social networking system;
clustering the users, based on the collected data into a plurality of clusters, the clusters separated by the activity of the users;
identifying, by comparing a network graph of a particular user to network graphs of other users in a particular cluster of the clusters, anomalous activity on the online social networking system by the particular user in the particular cluster, the network graph including nodes representing respective users and edges between nodes indicating how the respective users are connected to other users of the users in the online social networking system;
predicting, based on data relating to activity of other users in a same or different cluster of the clusters that have updated their profile, an update to a profile of the particular user on the online social networking system based on the identified anomalous activity of the particular user, wherein predicting the update includes generating a plurality of predicted updates to the profile of the particular user, generating a probability score for each predicted update;
presenting to the particular user one or more of the predicted updates to the profile of the particular user based on the predicting;
receiving input regarding the proposed update from the particular user in response to the one or more presented updates; and
updating the profile of the particular user based on the input received from the particular user.

13. The non-transitory computer readable medium of claim 12, wherein the anomalous activity comprises, when compared with other users in the particular cluster, different changes in connection data of the particular user, different changes in invitation data of the particular user, or different changes in search data of the particular user, during the time period; and
wherein the different changes in the connection data of the particular user comprises, when compared with other users in the particular cluster, an appearance or increase in a number of connections of the particular user to users from a particular organization.

14. The non-transitory computer readable medium of claim 12, wherein the anomalous activity, when compared with other users in the particular cluster, relates to one or more of a different IP address used by the particular user, a different amount of time spent on the online social network system by the particular user, a different amount of time using a job function on the online social networking system, and a different number of profile views of the particular user and a different number of profile views by the particular user on the online social networking system.

15. The computer readable medium of claim 12, wherein the predicting the update to the profile of the particular user comprises predicting a new organization with which the particular user has become associated; and
comprising:
transmitting an inquiry to the particular member to determine whether the particular user has become associated with the new organization; and
modifying the profile of the particular user to include the new organization when the particular user indicates that they are associated with the new organization.

16. A system comprising:
a computer processor; and
a computer memory coupled to the computer processor;
wherein the computer processor is operable for:
collecting, over a time period, data relating to activity of users in an online social networking system;
clustering the users, based on the collected data, into a plurality of clusters, the clusters separated by the activity of the users;
identifying, by comparing a network graph of a particular user to network graphs of other users in a particular cluster of the clusters, anomalous activity on the online social networking system by the particular user in the particular cluster, the network graph including nodes representing respective users and edges between nodes indicating how the respective users are connected to other users of the users in the online social networking system;
predicting, based on data relating to activity of other users in a same or different cluster of the clusters that have updated their profile, an update to a profile of the particular user on the online social networking system based on the identified anomalous activity of the particular user, wherein predicting the update includes generating a plurality of predicted updates to the profile of the particular user, generating a probability score for each predicted update;
presenting to the particular user one or more of the predicted updates to the profile of the particular user based on the predicting;
receiving input regarding the proposed update from the particular user in response to the one or more presented updates; and
updating the profile of the particular user based on the input received from the particular user.

17. The system of claim 16, wherein the system is operable for applying the updated profile of the particular user to one or more products of the online social networking system such that the one or more products can provide an improved service to the particular user based on the updated profile of the particular user.

18. The system of claim 16, wherein the clustering is a function of a similarity or match between the particular user and users in a cluster of one or more of an employer, a job position, a job tenure, an educational institution, a geographical location, a number of connections, and a time period since a last update to a profile.

19. The system of claim 16, wherein the predicting the update to the profile of the particular user comprises classifying the clustered data using one or more of logistic regression, gradient boosted trees, and random forest.

* * * * *

UNITED STATES PATENT AND TRADEMARK OFFICE
CERTIFICATE OF CORRECTION

PATENT NO. : 11,205,128 B2
APPLICATION NO. : 15/938147
DATED : December 21, 2021
INVENTOR(S) : Soong et al.

Page 1 of 1

It is certified that error appears in the above-identified patent and that said Letters Patent is hereby corrected as shown below:

In the Claims

In Column 14, Line 19, in Claim 3, delete "uses" and insert --users-- therefor

In Column 15, Line 19, in Claim 12, after "data", insert --,--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*